April 6, 1926.
L. B. SPERRY
1,579,670
MEANS FOR DETERMINING RANGE
Filed April 13, 1921
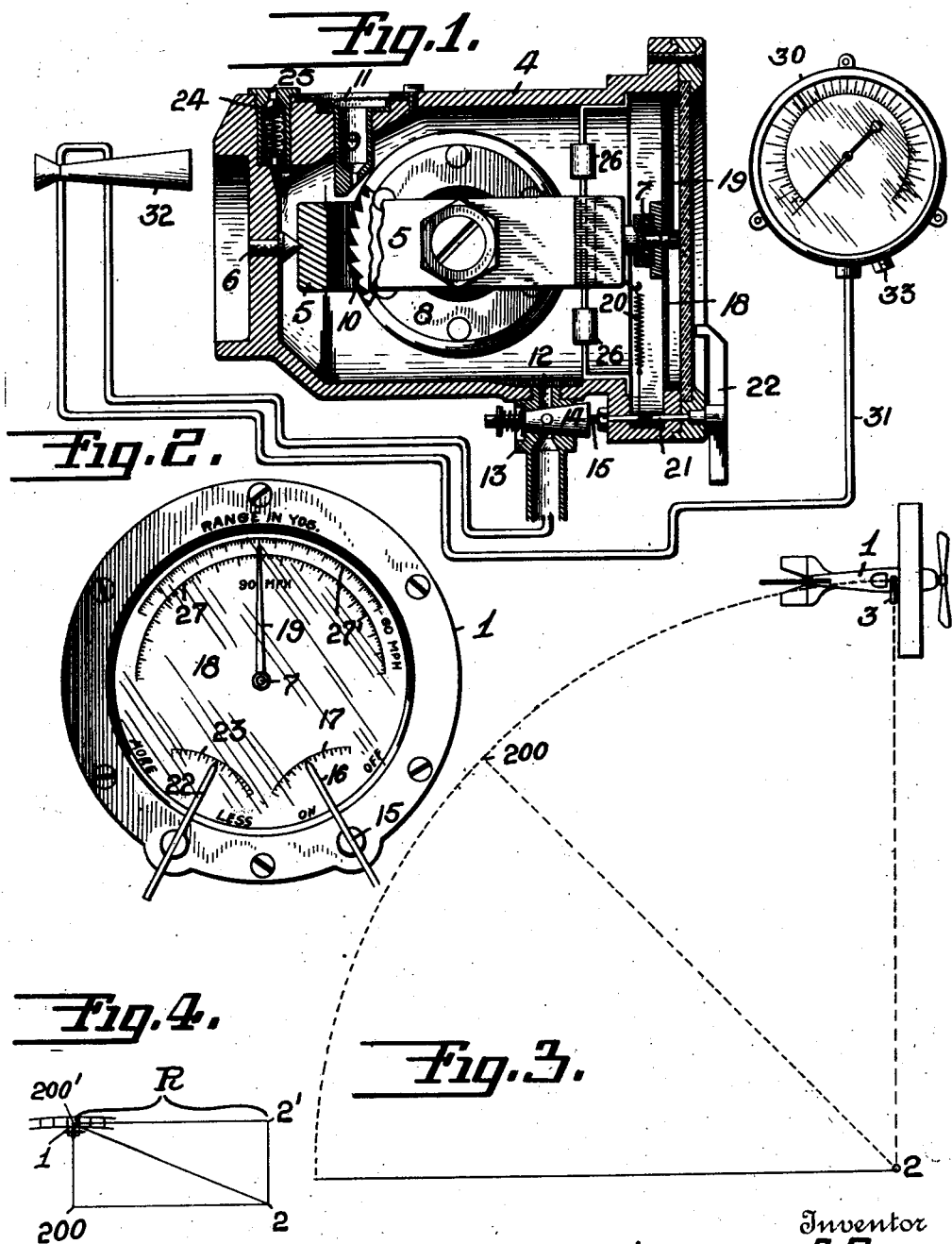
Inventor
LAWRENCE B. SPERRY.
By his Attorney
Herbert H. Thompson Patented Apr. 6, 1926.

1,579,670

UNITED STATES PATENT OFFICE.

LAWRENCE B. SPERRY, OF FARMINGDALE, NEW YORK, ASSIGNOR TO THE SPERRY GYROSCOPE COMPANY, OF BROOKLYN, NEW YORK, A CORPORATION OF NEW YORK.

MEANS FOR DETERMINING RANGE.

Application filed April 13, 1921. Serial No. 460,933.

*To all whom it may concern:*

Be it known that LAWRENCE B. SPERRY, a citizen of the United States of America, residing at Farmingdale, L. I., in the county of Nassau and State of New York, has invented certain new and useful Improvements in Means for Determining Range, of which the following is a specification.

This invention is concerned with a novel method of and means for obtaining the range of a distant object. Broadly, the invention consists in rotating an element at a definite linear velocity in an arc of a circle having said object as a center, and obtaining the angular velocity of the element. With both the linear and angular velocities of the element known the radius of the arc, which radius is the desired range, can readily be determined. I prefer to obtain the angular velocity of the element aforesaid by means of a gyroscopic turn-indicator, comprising a gyroscope mounted for precession upon turning of said element. The scale of the indicator may be graduated to indicate ranges for one or more definite linear speeds of the element upon which the indicator is mounted, so that the range in question may be read directly without the necessity of further computation. While any suitable movable element which can be driven at a constant speed may be employed, my system will be found to be especially advantageous and accurate when used in connection with an aeroplane or other aircraft.

Referring to the drawings where I have shown what I now consider to be the preferred method of and means for carrying out my invention, Fig. 1 is a view showing in section one type of gyroscopic turn indicator which may be employed, and also showing one form of linear speed indicator which may be used.

Fig. 2 is a front elevation of the indicator of Fig. 1.

Fig. 3 is a diagrammatic plan view showing how my invention may be carried out by an aeroplane.

Fig. 4 is a diagrammatic view in elevation illustrating my invention further.

In Figs. 3 and 4 the aeroplane is shown at 1 as flying in a horizontal plane in the arc of a circle about a vertical axis through the object 2 as a center. By keeping the aircraft turned so that some part thereof is continually directed on the object said aircraft may be caused to travel in the arc of a circle about said object as a center. This may be accomplished by a telescope 3 mounted athwartship of the aircraft so that the object 2 may sighted through said telescope. The same result may be obtained, if desired, without the aid of a telescope or other sighting instrument, by maintaining a wing tip or stay on the aeroplane between the observer and the object. Now, if the linear velocity V of the aircraft is known, and also the angular velocity A, the radius R of the arc in which the aircraft flies, which radius equals the range of the object, can be readily determined from the formula $A = V/R$. Consequently, if the airship flies along the arc above mentioned at a predetermined linear speed and the angular velocity of the craft is obtained, the range R of the object 2 may easily be indicated as a function of the angular velocity. Also, of course, if the angular velocity is made unity for the scale adopted, the observed linear velocity will furnish an indication of the range. It will, of course, be understood that by the range of the object I mean the distance in a horizontal plane from any point of the arc of travel of the aircraft to a vertical line through the object. This distance equals the distance from the object 2 to any point 200 directly below said arc of travel and in the same horizontal plane as said object. For example, in Fig. 4, let 200' be any given point on the arc of travel of the aircraft and directly above the point 200. Also let 2' be a point on the vertical axis through point 2 and in the same horizontal plane as point 200'. Then $R = 200' - 2' = 200 - 2$. The distance 200'—2 can be determined readily, if desired, when both R and the altitude of the aircraft are known.

The linear velocity of the aircraft can be readily measured in any of a variety of known ways. One type of instrument for indicating said linear velocity is shown at 30 in Fig. 1. A pipe 31 leads from the instrument to the restricted portion of a Venturi tube 32 mounted on the craft. The casing of the instrument is also open to the atmosphere at 33. This type of indicator is well known in the art and is shown, for example, in the U. S. patent to Bristol, No. 1,240,790, Sept. 18, 1917. Consequently, the details of said indicator will not be described here.

In order to indicate the angular velocity of travel of the aircraft a gyroscopic turn indicator of the type shown in Fig. 1 may be employed on the aircraft. This turn indicator is shown and described in detail in my Patent No. 1,433,102, dated Oct. 24, 1922, for "turn indicators." As shown this form of turn indicator comprises a casing 4 within which is mounted a frame 5 supported from the casing by means of pivots 6 and 7. A gyroscopic rotor 8 is supported by frame 5 for rotation about an axis at right angles to the axis of said pivots. For driving the rotor air may be directed through a nozzle 9 upon blades 10 on the periphery of the rotor. The nozzle 9 is in communication at one end with the atmosphere outside of the casing and a screen 11 is preferably provided to prevent foreign matter from being carried into the casing by the air. Air may be exhausted from the casing through the opening 12 and fitting 13 by coupling any suitable type of exhaust pump thereto, such as the Venturi tube 32. In this manner air may be automatically drawn through the nozzle 9 as the aircraft flies on its course. A valve 14 is journalled in the fitting 13. To said valve is secured a shaft 15 on the outer end of which is mounted a combined thumb piece and indicator 16 readable on a scale 17 on a stationary plate 18 fitted into the front of the casing 1. By this means the rate at which air is drawn through the casing may be varied. The pivots 6 and 7 are preferably placed parallel with the fore and aft axis of the aircraft. Upon turning of the craft in azimuth, precession of the gyroscope occurs about the axis of said pivots and thereupon an indicator 19, which is movable with pivot 7, is moved with respect to the stationary plate 18. A centralizing tension spring 20 is connected at one end to the frame 5 and at its other to a shaft 21 rotatable in the casing, as shown, and provided on its outer end with a combined thumb nut and indicator 22 readable on a scale 23 on plate 18. The tension on said spring may thus be varied as desired. It will be seen that precession of the gyroscope in either of opposite directions will extend said spring.

The rate at which the rotor is driven may be limited by means of a spring pressed valve member 24 which normally closes an aperture 25 leading into the casing but which is drawn away from said aperture when the pressure within the casing 1 becomes too low. In this way the speed of the rotor may be maintained comparatively constant regardless of variations in the rate of drawing air through the casing. Suitable stops 26 may be provided for engagement by frame 5 to limit the amount of precession in either of opposite directions and prevent overturning of the gyroscope.

When the aircraft turns in azimuth the gyroscope precesses against the action of spring 20. The extension of said spring is proportional to the gyroscopic reaction or force of precession of the gyroscope, which, in turn, is proportional to the angular velocity of the craft in azimuth, and hence the angle that the frame 5 moves about the axis of the pivots 6—7 will show said angular velocity of the craft. The pointer 19, of course, moves with frame 5 and hence moves proportionally to the said angular velocity. Now if the linear velocity of the craft be kept constant, the position of said pointer 19 will indicate the radius of the arc of turn. Consequently graduations indicating the radius of turn may be provided on plate 18 for cooperation with said pointer 19. I have shown two sets, 27, 27', of such graduations, said sets corresponding to different linear speeds of the aircraft. For example, the set 27 of said graduations may correspond to a linear velocity of the craft of 90 miles per hour and the set 27' to a linear velocity of 60 miles per hour. Since the graduations of the scale 27 are spaced apart farther than those of scale 27', said scale 27 is shown longer than scale 27'. Since the radius of turn aforesaid is equal to the desired range of the object 2, that is, to the distance in a horizontal plane from any point on the arc of travel of the craft to a vertical axis through said object, the graduations 27, 27' may be arranged to indicate the range in yards or in any other desired units.

It will thus be evident that to ascertain the distance of the object 2 from any given point 200, the aircraft may fly at any desired height above said point 200 and should be kept traveling at a constant known linear velocity through the air in the arc of a circle having the vertical axis through the object 2 as a center and a radius equal to the distance of said point 200 to said object. The pointer 19, in cooperation with that set of graduations which corresponds to the linear velocity of the craft, then indicates the desired distance or range in yards. Any desired number of sets of graduations for cooperation with pointer 19 may be provided thus giving a wider range of linear velocities at which the craft may be driven. If desired, only one set of graduations may be provided and the tension of spring 20 varied in accordance with different linear velocities so that for any given linear velocity the pointer 19 will indicate the desired range on the one set of graduations. Instead of varying the tension of spring 20, the valve 14 may be adjusted in accordance with different linear velocities, thereby varying the rate at which air is drawn through the casing 1 and hence the speed of rotation of rotor 8, so that the range for any given linear velocity may be read from one set of graduations.

As an alternative, the scale of the linear speed indicator 30 may be graduated to indicate range, since when the craft is driven at a predetermined angular velocity about the object as a center the range is proportional to the linear velocity. The craft may readily be driven at a definite angular velocity by observing the indicating pointer 19.

Of course, it is not necessary that an aircraft be employed, since the turn indicator may be mounted on any other movable carriage or element which can be driven at a constant speed in the arc of a circle. Owing to the special adaptability of aircraft for observation purposes, however, and to the possibility of driving said craft at high velocities so that especially accurate indications of angular velocity or range may be obtained, it will be seen that my method of determining range is especially advantageous when used in connection with aircraft.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. In an instrument for indicating the radius of curvature of the arc of travel of a movable element, means responsive to angular velocity of said element and an indicator actuated by said means, said instrument having a scale graduated to indicate the radius of curvature.

2. The combination with a dirigible craft, means responsive to linear velocity of the craft, means responsive to the angular velocity of the craft and means whereby one of said first two means indicates the radius of the arc of travel of said craft when one of said velocities is constant.

3. The combination with a dirigible craft, means responsive to linear velocity of the craft, means responsive to angular velocity of the craft, one of said means having means for indicating the radius of the course traveled by said craft when the velocity to which the other of said means responds is constant.

4. The combination with a dirigible craft, means responsive to linear velocity of the craft, means responsive to angular velocity of the craft, said second means having means for indicating the radius of the course traveled by said craft when the linear velocity is constant.

5. The combination with a dirigible craft, means for indicating the radius of the arc of travel of said craft when either the linear velocity or angular velocity of the craft is constant, said means comprising a means responsive to linear velocity of the craft and means responsive to angular velocity of the craft.

In testimony whereof I have affixed my signature.

LAWRENCE B. SPERRY.